(12) United States Patent
Schultz

(10) Patent No.: US 11,720,953 B2
(45) Date of Patent: *Aug. 8, 2023

(54) METHODS AND SYSTEMS FOR PERFORMING CHANGE MANAGEMENT AT LOGIN

(71) Applicant: salesforce.com, inc., San Francisco, CA (US)

(72) Inventor: Eric Schultz, San Francisco, CA (US)

(73) Assignee: salesforce.com, inc.

( * ) Notice: Subject to any disclaimer, the term of this patent is extended or adjusted under 35 U.S.C. 154(b) by 0 days.

This patent is subject to a terminal disclaimer.

(21) Appl. No.: 17/448,696

(22) Filed: Sep. 23, 2021

(65) Prior Publication Data

US 2022/0012797 A1 Jan. 13, 2022

Related U.S. Application Data

(63) Continuation of application No. 16/773,277, filed on Jan. 27, 2020, now Pat. No. 11,151,638.

(51) Int. Cl.
| | |
|---|---|
| *G06F 16/00* | (2019.01) |
| *G06Q 30/0601* | (2023.01) |
| *G06F 16/21* | (2019.01) |
| *G06F 16/23* | (2019.01) |
| *G06F 16/248* | (2019.01) |
| *G06F 16/25* | (2019.01) |
| *G06F 8/65* | (2018.01) |
| *G06F 21/31* | (2013.01) |

(Continued)

(52) U.S. Cl.
CPC .......... *G06Q 30/0635* (2013.01); *G06F 8/65* (2013.01); *G06F 8/71* (2013.01); *G06F 16/219* (2019.01); *G06F 16/2379* (2019.01); *G06F 16/248* (2019.01); *G06F 16/252* (2019.01); *G06F 21/31* (2013.01); *H04L 63/08* (2013.01); *H04W 4/60* (2018.02); *G06F 16/8358* (2019.01); *G06N 5/022* (2013.01)

(58) Field of Classification Search
CPC ........ G06Q 30/0635; G06F 8/71; H04L 63/08
See application file for complete search history.

(56) References Cited

U.S. PATENT DOCUMENTS

| | | |
|---|---|---|
| 5,577,188 A | 11/1996 | Zhu |
| 5,608,872 A | 3/1997 | Schwartz et al. |

(Continued)

*Primary Examiner* — Tuan A Vu

(74) *Attorney, Agent, or Firm* — LKGlobal | Lorenz & Kopf LLP

(57) ABSTRACT

A system and related method for change management at login. The method includes constructing an administratively prescribed target data store as a function of received administrative input prescribing a target feature and target feature-state, and related messages to push to a user upon occurrences of target feature mismatches and matches. Login information, including a username identifier, service provider identifier, and current use time-stamp are received for a user. A historical data store is queried to obtain a user status that associates the username identifier and the service provider identifier with a previously used feature, feature-state and a previous use time-stamp. The target data store is queried for the service provider. Determinations are made as to whether previous feature use matches target feature use. Messages are displayed responsive thereto.

20 Claims, 4 Drawing Sheets

(51) Int. Cl.
  *H04L 9/40*     (2022.01)
  *G06F 8/71*     (2018.01)
  *H04W 4/60*     (2018.01)
  *G06N 5/022*    (2023.01)
  *G06F 16/835*   (2019.01)

(56) References Cited

U.S. PATENT DOCUMENTS

| | | |
|---|---|---|
| 5,649,104 A | 7/1997 | Carleton et al. |
| 5,715,450 A | 2/1998 | Ambrose et al. |
| 5,761,419 A | 6/1998 | Schwartz et al. |
| 5,819,038 A | 10/1998 | Carleton et al. |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |
| 6,092,083 A | 7/2000 | Brodersen et al. |
| 6,161,149 A | 12/2000 | Achacoso et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,135 B1 | 4/2001 | Brodersen et al. |
| 6,233,617 B1 | 5/2001 | Rothwein et al. |
| 6,266,669 B1 | 7/2001 | Brodersen et al. |
| 6,295,530 B1 | 9/2001 | Ritchie et al. |
| 6,324,568 B1 | 11/2001 | Diec et al. |
| 6,324,693 B1 | 11/2001 | Brodersen et al. |
| 6,336,137 B1 | 1/2002 | Lee et al. |
| D454,139 S | 3/2002 | Feldcamp et al. |
| 6,367,077 B1 | 4/2002 | Brodersen et al. |
| 6,393,605 B1 | 5/2002 | Loomans |
| 6,405,220 B1 | 6/2002 | Brodersen et al. |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans et al. |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 7,062,502 B1 | 6/2006 | Kesler |
| 7,069,231 B1 | 6/2006 | Cinarkaya et al. |
| 7,181,758 B1 | 2/2007 | Chan |
| 7,289,976 B2 | 10/2007 | Kihneman et al. |
| 7,340,411 B2 | 3/2008 | Cook |
| 7,356,482 B2 | 4/2008 | Frankland et al. |
| 7,401,094 B1 | 7/2008 | Kesler |
| 7,412,455 B2 | 8/2008 | Dillon |
| 7,508,789 B2 | 3/2009 | Chan |
| 7,620,655 B2 | 11/2009 | Larsson et al. |
| 7,698,160 B2 | 4/2010 | Beaven et al. |
| 7,730,478 B2 | 6/2010 | Weissman |
| 7,779,475 B2 | 8/2010 | Jakobson et al. |
| 8,014,943 B2 | 9/2011 | Jakobson |
| 8,015,495 B2 | 9/2011 | Achacoso et al. |
| 8,032,297 B2 | 10/2011 | Jakobson |
| 8,082,301 B2 | 12/2011 | Ahlgren et al. |
| 8,095,413 B1 | 1/2012 | Beaven |
| 8,095,594 B2 | 1/2012 | Beaven et al. |
| 8,209,308 B2 | 6/2012 | Rueben et al. |
| 8,275,836 B2 | 9/2012 | Beaven et al. |
| 8,457,545 B2 | 6/2013 | Chan |
| 8,484,111 B2 | 7/2013 | Frankland et al. |
| 8,490,025 B2 | 7/2013 | Jakobson et al. |
| 8,504,945 B2 | 8/2013 | Jakobson et al. |
| 8,510,045 B2 | 8/2013 | Rueben et al. |
| 8,510,664 B2 | 8/2013 | Rueben et al. |
| 8,566,301 B2 | 10/2013 | Rueben et al. |
| 8,646,103 B2 | 2/2014 | Jakobson et al. |
| 11,151,638 B2 * | 10/2021 | Schultz .............. G06Q 30/0635 |
| 2001/0044791 A1 | 11/2001 | Richter et al. |
| 2002/0072951 A1 | 6/2002 | Lee et al. |
| 2002/0082892 A1 | 6/2002 | Raffel |
| 2002/0129352 A1 | 9/2002 | Brodersen et al. |
| 2002/0140731 A1 | 10/2002 | Subramanian et al. |
| 2002/0143997 A1 | 10/2002 | Huang et al. |
| 2002/0162090 A1 | 10/2002 | Parnell et al. |
| 2002/0165742 A1 | 11/2002 | Robbins |
| 2003/0004971 A1 | 1/2003 | Gong |
| 2003/0018705 A1 | 1/2003 | Chen et al. |
| 2003/0018830 A1 | 1/2003 | Chen et al. |
| 2003/0041053 A1 | 2/2003 | Roth |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec et al. |
| 2003/0189600 A1 | 10/2003 | Gune et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio et al. |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes-Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2006/0021019 A1 | 1/2006 | Hinton et al. |
| 2008/0249972 A1 | 10/2008 | Dillon |
| 2009/0063414 A1 | 3/2009 | White et al. |
| 2009/0100342 A1 | 4/2009 | Jakobson |
| 2009/0177744 A1 | 7/2009 | Marlow et al. |
| 2011/0247051 A1 | 10/2011 | Bulumulla et al. |
| 2012/0042218 A1 | 2/2012 | Cinarkaya et al. |
| 2012/0218958 A1 | 8/2012 | Rangaiah et al. |
| 2012/0233137 A1 | 9/2012 | Jakobson et al. |
| 2013/0132854 A1 | 5/2013 | Raleigh et al. |

(56) References Cited

U.S. PATENT DOCUMENTS

| | | |
|---|---|---|
| 2013/0212497 A1 | 8/2013 | Zelenko et al. |
| 2013/0218948 A1 | 8/2013 | Jakobson |
| 2013/0218949 A1 | 8/2013 | Jakobson |
| 2013/0218966 A1 | 8/2013 | Jakobson |
| 2013/0247216 A1 | 9/2013 | Cinarkaya et al. |
| 2013/0290234 A1 | 10/2013 | Harris et al. |
| 2019/0306137 A1 | 10/2019 | Isaacson et al. |

* cited by examiner

METHODS AND SYSTEMS FOR PERFORMING CHANGE MANAGEMENT AT LOGIN

CROSS REFERENCE TO RELATED APPLICATION

This application is a continuation of U.S. patent application Ser. No. 16/773,277, filed Jan. 27, 2020, which is incorporated herein by reference in its entirety.

TECHNICAL FIELD

Embodiments relate to change management methods and systems. More particularly, embodiments relate to enabling change management upon login.

BACKGROUND

Organizations often need to increase adoption of features in a service provider, control feature use on a by user basis, or otherwise interact with a user regarding the use of features and/or service providers. These technical problems are addressed with various change management solutions. An available change management solution is to email users the pertinent information. However, emails can easily be ignored, and people can feel bombarded by emails and become desensitized to them. Also, there may be a time delay between when a user receives a change management email and when the user attempts to utilize the respective service provider. For these reasons, available change management solutions may be ineffective and inefficient.

Accordingly, it is desirable to have methods and systems that can be used to efficiently and effectively perform change management when a user attempts a login to a service provider. In addition, it is desirable that the methods and systems be customizable and specific to a user's prior and anticipated feature usage. Furthermore, other desirable features and characteristics will become apparent from the subsequent detailed description and the appended claims, taken in conjunction with the accompanying drawings and the foregoing technical field and background.

BRIEF DESCRIPTION OF THE DRAWINGS

A more complete understanding of the subject matter may be derived by referring to the detailed description and claims in conjunction with the following figures, wherein like reference numbers refer to similar elements throughout the figures.

DETAILED DESCRIPTION

The following detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, brief summary or the following detailed description.

In the following description, numerous specific details are set forth. However, embodiments of the invention may be practiced without these specific details. In other instances, well-known structures and techniques have not been shown in detail in order to avoid obscuring the understanding of this description.

As mentioned, an organization will utilize a change management solution when the organization needs to increase adoption of features in a service provider, control feature-use by a user, or otherwise interact with a user regarding the use of features and/or service providers. Attempting change management by email can be both inefficient and ineffective. The provided embodiments can be used to efficiently and effectively perform change management upon login by a user to a respective service provider. Received administrative input prescribing, for a service provider, a target feature and target feature-state, and related messages are configured into a target data store and used to push messages to a user at login. The provided embodiments are administratively customizable and specific to a user's prior and required feature usage. The provided embodiments are described in more detail below.

Figure 1:
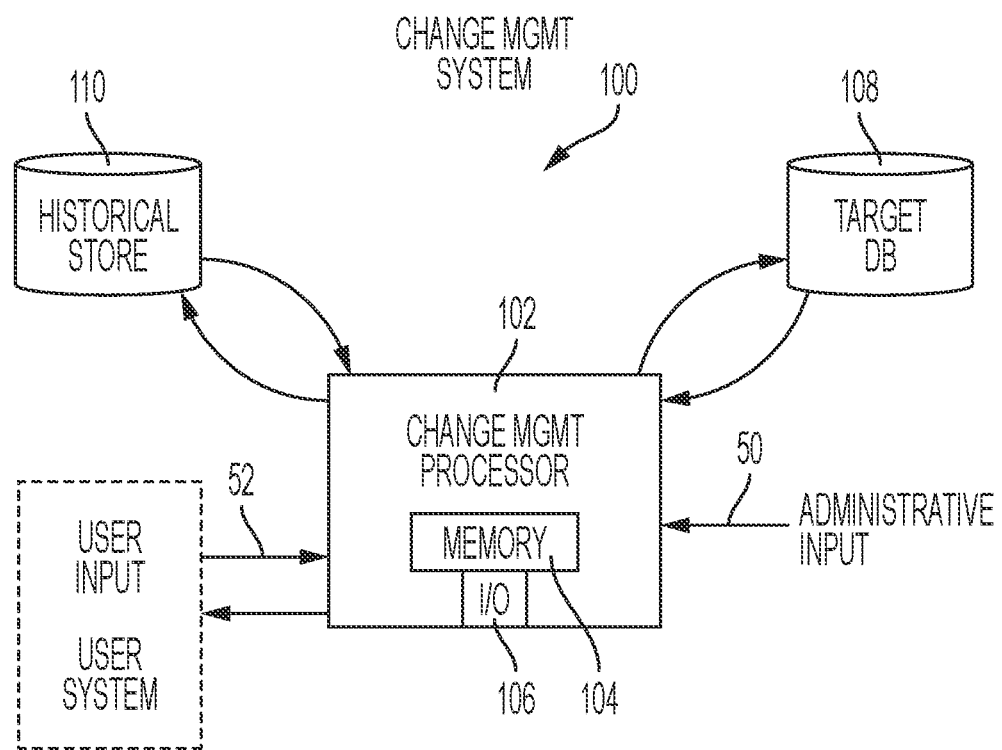
FIG. 1 depicts a functional block diagram of a change management system, in accordance with various embodiments.
Figure 2:
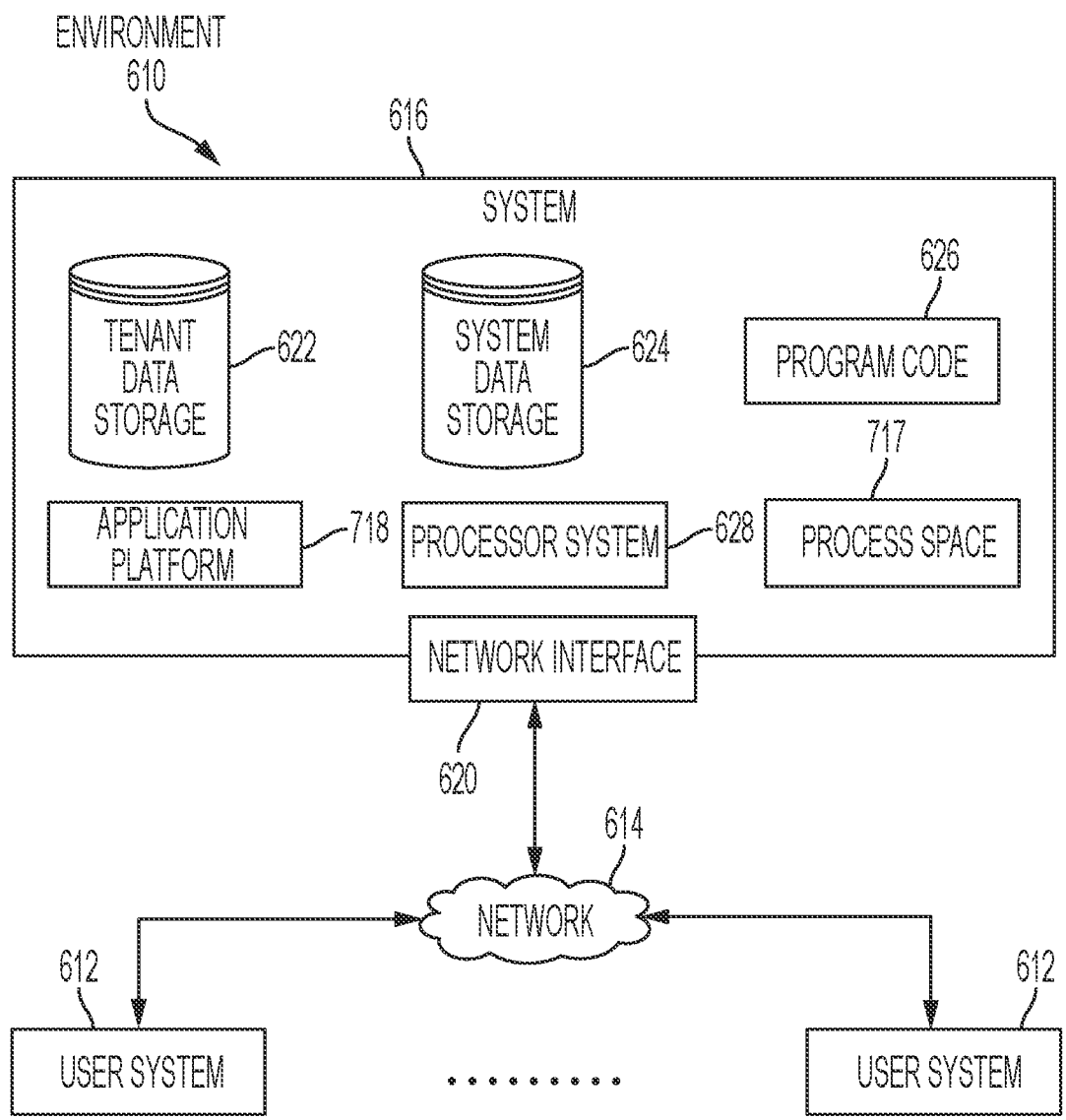
FIG. 2 is a block diagram representation of an exemplary environment in which the change management system might be used.
Figure 3:
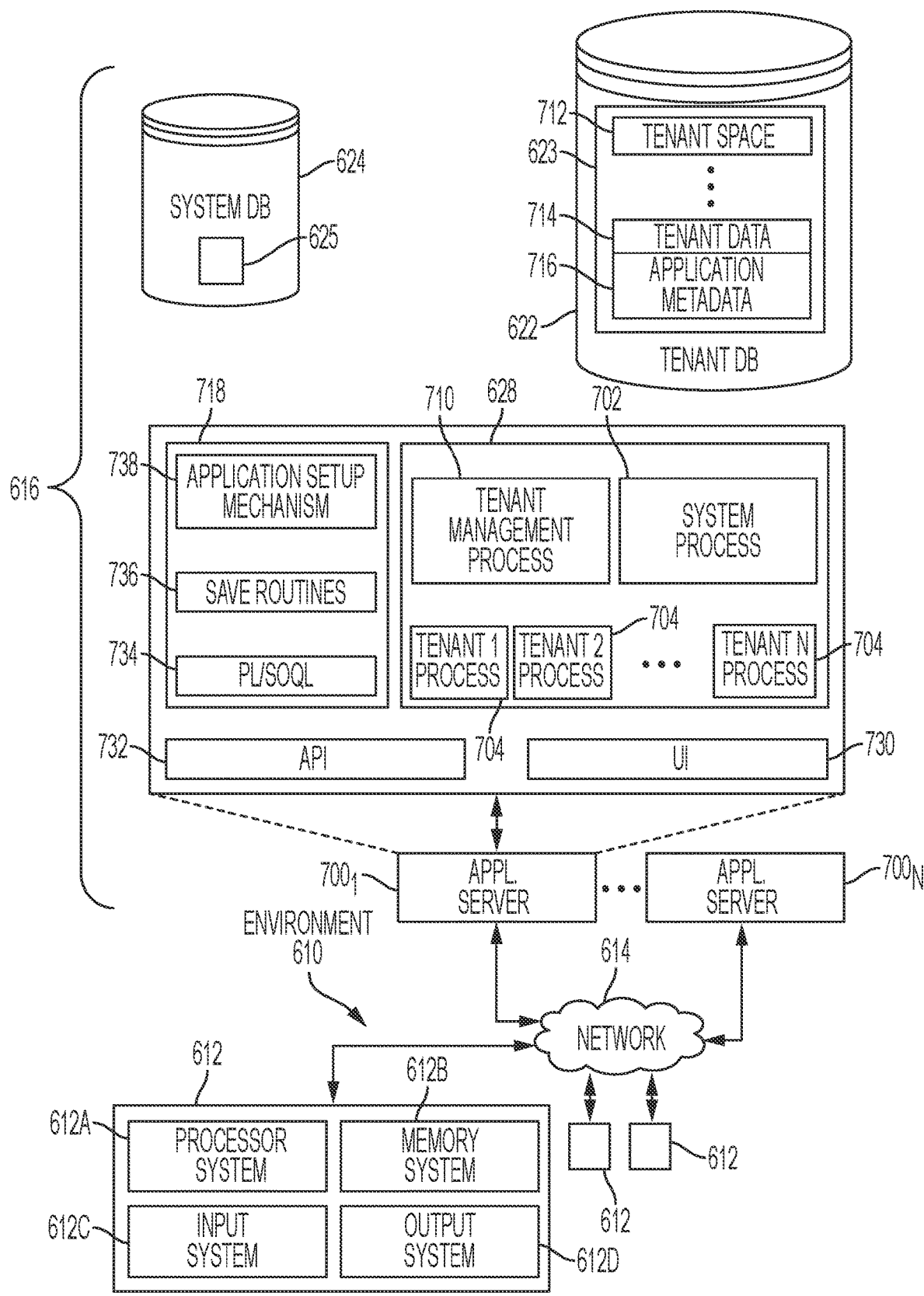
FIG. 3 is a block diagram representation of another exemplary environment in which the change management system might be used.

FIG. 1 depicts a functional block diagram of an exemplary embodiment of a change management system 100. The change management system 100 includes a change management processor 102 (also, see, FIG. 2, 628) that interacts with a target data database 108 and a historical data store 110. The change management processor 102 is programmed (for example, with program code 626, FIG. 2) to implement the algorithm described hereinbelow. In various embodiments, the change management processor 102 is integrated with, or in communication with, memory 104 and an input/output port 106 (in various embodiments, referred to as a network interface, as shown in FIG. 2, 614). The user input may be received from an input system (FIG. 3, 612C). In an embodiment, the administrative input 50 is obtained during an initialization or a file upload step. In some embodiments, the administrative input 50 is obtained via a different user system 612 that that used by other users. The functionality of the change management system 100 may be described in connection with FIG. 4.

Figure 4:
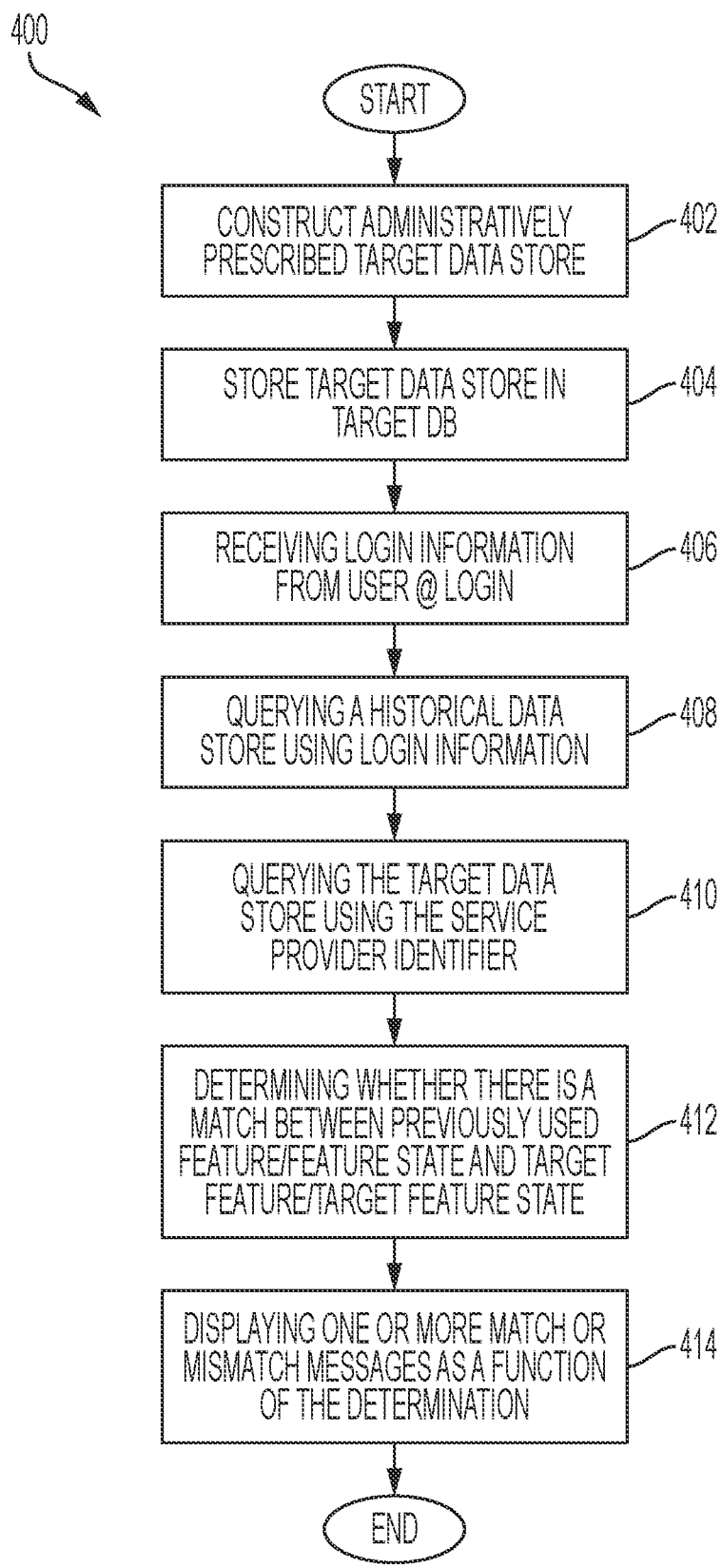
FIG. 4 is a flow chart showing steps of a method for change management, in accordance with exemplary embodiments

FIG. 4 depicts the various algorithmic steps or tasks performed in a process 400 that may be performed by software, hardware, firmware, or any combination thereof. For illustrative purposes, the following description of process 400 may refer to elements mentioned above in connection with FIG. 1, and with elements described in connection with FIGS. 2-3. In practice, portions of process 400 may be performed by different elements of the described system, e.g., component A, component B, or component C. It should be appreciated that process 400 may include any number of additional or alternative tasks, the tasks shown in FIG. 4 need not be performed in the illustrated order, and process 400 may be incorporated into a more comprehensive procedure or process having additional functionality not described in detail herein. Moreover, one or more of the tasks shown in FIG. 4 could be omitted from an embodiment of the process 400 as long as the intended overall functionality remains intact.

At 402, the provided algorithm begins by using the change management processor 102 or other logic gating circuitry to construct an administratively prescribed target data store and store it in the target data database 108. In various embodiments, the administrative input 50 includes service provider information, including for each of one or more service provider identifiers, a target feature, a target feature-state, a mismatch message, a match message, and a time threshold. In various embodiments, for each of the one or more service providers, the administrative input 50 further includes one or more additional time thresholds and one or more additional messages. The match messages and mismatch messages may further be programmatic, in that they activate other service providers, applications, or hyperlinks, as examples below illustrate.

Also at 402, the change management processor 102 determines an appropriate data configuration for the administratively prescribed target data store as a function of the administrative input 50. In an example, the change management processor 102 determines, based on the administrative input 50, that the target data store shall be configured as a table, and further determines an array size and storage location in the target data database 108 for the table. In an example, the information in the target data database 108 may be arranged by the change management processor 102 as shown in administratively prescribed target data feature-state version 6 (V6). The service provider SP2 has target feature 1 (F1) that has a target feature-state under development. The remaining columns, or fields, of administratively prescribed target data Table 1 will be described in more detail in connection with subsequent algorithmic steps. It may be appreciated that the associations between pieces of information indicated as a rows and columns arrangement of target data table 1 can be depicted in other arrangements in the target data database 108.

In various embodiments, the administrative input 50 may also include user information, including a list of username identifiers and for each username identifier, a list of service provider identifiers and respective features and feature-states that the username identifier is authorized to use. In some embodiments, the change management processor 102 or other logic gating circuitry will combine the user information with the service provider information when creating the administratively prescribed target data store.

As mentioned, the administrative input 50 may be obtained in various ways, some non-limiting examples include: as part of a software initialization/upload process, as part of an individual administrator using a user input system, or as part of any commonly practiced system update protocol. The change management processor 102 or other logic gating circuitry constructs and populates the target data store in response to, and as a function of, receiving the administrative input 50 and stores it in the target data database 108 at 404.

TABLE 1

| Service Provider identifier | Feature | Feature-state | Mismatch msg | Match msg | Time threshold-1 | Additional time threshold-1 | additional message-1 |
|---|---|---|---|---|---|---|---|
| SP1 | F1 | V2 | There is a new version available, would you like to try V2? | Thank you for utilizing V2, please click on these links to get started | 10 days | | |
| SP1 | F2 | V3 | Please update to V3 | Thank you for utilizing V3 | 2 weeks | | You no longer have access to SP1 F2 |
| SP1 | F3 | V6 | Please update to V6 | New version coming soon/new feature available | 30 days | 2 weeks | Why have you reverted to a previous version? |
| SP2 | F1 | Under development | | Expected launch date | March 1, 2020 | | |
| ... | | | | | | | |

Table 1, below.

In various embodiments, entries in the administratively prescribed target data store are referred to as service provider associations, and each service provider association comprises multiple fields. In the depicted example, the service provider identifier SP1 has three associations or entries, which represent three target features in use, as follows: Target feature 1 (F1) has a target feature-state version 2 (V2); Target feature 2 (F2) has a target feature-state version 3 (V3); and Target feature 3 (F3) has a target In various embodiments, the user is identified by a username identifier. The historical data store 110 is a data storage device or location used to store a plurality of user status', including, for each user username identifier, an association between the username identifier and a service provider identifier with a previously used feature, feature-state, and a previous use time-stamp (i.e., a date and time) indicating when the user previously used the [service provider:feature:feature-state]. Said differently, the historical data store 110 has stored therein, for each username identifier, each service provider, feature, and feature-state used, and at what time. In an example, an entry in the historical data store 110 may include: on Dec. 5, 2019, at 1 PM EST, the username identifier-1 used SP1:F1:V2 and SP1:F3:V5, and on Dec. 1, 2019, at 5 PM EST, SP1:F3:V6. As may be appreciated, this is a simplified example for illustration of concepts: in practice, it is likely that the entry in the historical data store 110 includes many more entries for the username identifier-1.

The process of constructing and populating the target data store in the target data database 108 (at 402 and 404) may be separated in time and space from the change management interactions with the user. The user's experience of the provided change management methodology is experienced when a user attempts to log into a service provider; this is referred to herein as a login. At 406, the login embodies login information that is received, via user input 52, by the change management processor 102. The login information may include a current use time-stamp, the username identifier for the user, and a service provider identifier. In an example, the username identifier-1 attempts a login to SP1 on Jan. 2, 2020, at 8 AM EST.

Upon receiving the login information, the change management processor 102 queries the historical data store 110 (at 408) for a user status using the username identifier and service provider identifier. Continuing with the example, the change management processor 102 retrieves the following user status for username identifier-1: on Dec. 5, 2019, at 1 PM EST, the username identifier-1 used SP1:F1:V2 and SP1:F3:V5, and on Dec. 1, 2019, at 5 PM EST, SP1:F3:V6.

Also responsive to the login, at 410, the change management processor 102 queries the target data store in the target data database 108 using at least the service provider identifier, and retrieves, as a function of the service provider identifier, the fields representing the service provider identifier associations. Continuing with the example, using SP1, the change management processor 102 retrieves the fields [SP1:F1:V2: There is a new version available, would you like to try V2?: Thank you for utilizing V2, please click on these links (active hypertext links) to get started:10 days] and [SP1:F3:V6:Please update to V6:New Version Coming soon/new feature available:30 days:2 weeks: Why have you reverted to a previous version?].

At 412, the change management processor 102 compares related fields to determine whether there is a match, taking into account the fields of the user status and the service provider identifier associations (note that this is a binary determination, and may be described as [match:mismatch]; [match:not a match]; and [mismatch:not a mismatch]). Continuing with the above example, the change management processor 102 determines that, for username identifier-1 and SP1, previously used F1:V2 matches target F1:V2="Match", but previously used F3:V5 is does not match with target F3:V6="Mismatch."

As mentioned, the provided algorithm uses the change management processor 102 or other gating logic circuitry to push change management information and instructions to the user at the point of login (at 414), at least in part, by identifying these matches and mismatches. This returns our discussion to the additional columns or fields in the administratively prescribed target data table 1. The additional columns or fields shown in administratively prescribed target data Table 1 store the administratively prescribed information and instructions that the administrators wish to push to the user. For example, when there is a mismatch, the change management processor 102 references the respective mismatch message and generates commands to display messages for the user system 612 to display the respective mismatch message. The change management processor 102 may determine that the mismatch represents that the target feature has been updated, and may determine that the mismatch represents that the user is attempting to use an outdated version of the target feature. Responsive to the determinations made at 412, the change management processor 102 may display (at 414) an updated version available message responsive thereto. In the example, the mismatch message for F3 is "please update to V6" (version 6).

At 414, the provided algorithm also references one or more time thresholds to provide administrative control over when change management messages will be displayed. In an example, when there is a match, the change management processor 102 may compare the current use-timestamp to the time threshold and display a match message only when the current use-timestamp does not exceed the time threshold. In practice this may look like the user seeing a "thank you for utilizing V2" message for the first ten days that the user has updated to V2, but not after that. In another example, as illustrated in the table for SP1:F3:V6: when there is a match, the change management processor 102 may display information that a newer version will be released soon; it may further display that the new version may be released at a certain date.

At 414, in various embodiments, the provided algorithm may also use the change management processor 102 or other gating logic circuitry to pull [feature:version] use information from the user at the point of login, also at least in part, by identifying these matches and mismatches. In this example, there is an additional message to be displayed to the user, which asks the user, "why have you reverted to a previous version?" This is displayed at 414 because the change management processor 102 has identified, based on the user status, that the user had tried V6 previously, but went back to V5. The timing of when this message question is displayed to the user may be controlled by a second time threshold (e.g., it may only be relevant for two weeks, as indicated in the example Table 1). Another example of pulling use information from the user at login includes asking the user if the user would like to set a reminder to perform an upgrade (and then activating a calendar application responsive to the user's input. Another example of pulling use information from the user at login includes asking the user for feedback on the [service provider: feature]. Use information can be communicated back to the service provider, or analyzed by the administrators, or both. Using this kind of messaging at login enables the administrators to capture relevant user information and identify issues with service providers, features, and feature-states.

In embodiments in which the administrative input 50 includes user information, such as, a list of username identifiers and for each username identifier, a list of service provider identifiers and respective features and feature-states that the username identifier is authorized to use, the other message fields may be used to push access information. In an embodiment, the change management processor 102 may determine that the mismatch represents that the username identifier has lost authorization to use any of: the service provider identifier, the previously used feature, or the target feature, and display a failed authorization message responsive thereto. For example, as shown in Table 1 at SP1:F2:V3, there is the message, "You no longer have access to SP1 F2."

In an embodiment, the service provider identifier is one of a plurality of service provider identifiers; the username identifier is one of a plurality of username identifiers; each username identifier has an association with at least one service provider identifier of the plurality of service provider identifiers; and the historical data store further has stored therein, for each association of each username identifier of the plurality of username identifiers, a respective user status that associates the username identifier and the service provider identifier of the plurality of service provider identifiers, the user status further associating with the service provider identifier, a respective previously used feature, feature-state, and use-timestamp.

Further, each service provider identifier of the plurality of service provider identifiers may have at least one target feature and each target feature of the at least one target features may have a respective target feature-state. The target data store may have stored therein, for each of the at least one target feature of each service provider identifier of the plurality of service provider identifiers: a target feature-state, a mismatch message, a predefined time threshold, and a match message.

As may be appreciated, an advantage of the provided method and system is the flexibility of the administrative setup of the target data store in the target data database 108. The message content, and time thresholds, are administratively prescribable, as are the number of message fields and the number of time thresholds. By pushing this information to the user at login, the provided methods and systems deliver the information when it is most relevant, thereby increasing the compliance rate and minimizing the distraction of multiple emails.

The approaches and methodologies presented here can be utilized in various computer-based environments, network environments, and/or database system environments. In this regard, FIG. 2 illustrates a block diagram of an environment 610 wherein an on-demand database service might be used for purposes of supporting the subject matter described in more detail above. Environment 610 may include user systems 612, network 614, system 616, processor system 617, application platform 618, network interface 620, tenant data storage 622, system data storage 624 (which may include target data database 108 and/or historical data store 110), program code 626, and process space 628. In other embodiments, environment 610 may not have all of the components listed and/or may have other elements instead of, or in addition to, those listed above.

Environment 610 is an environment in which an on-demand database service exists. User system 612 may be any machine or system that is used by a user to access a database user system. For example, any of user systems 612 can be a handheld computing device, a mobile phone, a laptop computer, a work station, and/or a network of computing devices. As illustrated in herein FIG. 2 (and in more detail in FIG. 3) user systems 612 might interact via a network 614 with an on-demand database service, which is system 616.

An on-demand database service, such as system 616, is a database system that is made available to outside users that do not need to necessarily be concerned with building and/or maintaining the database system, but instead may be available for their use when the users need the database system (e.g., on the demand of the users). Some on-demand database services may store information from one or more tenants stored into tables of a common database image to form a multi-tenant database system (MTS). Accordingly, "on-demand database service 616" and "system 616" will be used interchangeably herein. A database image may include one or more database objects. A relational database management system (RDMS) or the equivalent may execute storage and retrieval of information against the database object(s). Application platform 618 may be a framework that allows the applications of system 616 to run, such as the hardware and/or software, e.g., the operating system. In an embodiment, on-demand database service 616 may include an application platform 618 that enables creation, managing and executing one or more applications developed by the provider of the on-demand database service, users accessing the on-demand database service via user systems 612-, or third-party application developers accessing the on-demand database service via user systems 612.

The users of user systems 612 may differ in their respective capacities, and the capacity of a particular user system 612 might be entirely determined by permissions (permission levels) for the current user. For example, where a field technician is using a particular user system 612 to interact with system 616, that user system has the capacities allotted to that field technician. However, while an administrator is using that user system to interact with system 616, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level.

Network 614 is any network or combination of networks of devices that communicate with one another. For example, network 614 can be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network, such as the global internetwork of networks often referred to as the Internet, that network will be used in many of the examples herein. However, it should be understood that the networks that one or more implementations might use are not so limited, although TCP/IP is a frequently implemented protocol.

User systems 612 might communicate with system 616 using TCP/IP and, at a higher network level, use other common Internet protocols to communicate, such as HTTP, FTP, AFS, WAP, etc. In an example where HTTP is used, user system 612 might include an HTTP client commonly referred to as a "browser" for sending and receiving HTTP messages to and from an HTTP server at system 616. Such an HTTP server might be implemented as the sole network interface between system 616 and network 614, but other techniques might be used as well or instead. In some implementations, the interface between system 616 and network 614 includes load sharing functionality, such as round-robin HTTP request distributors to balance loads and distribute incoming HTTP requests evenly over a plurality of servers. At least as for the users that are accessing that server, each of the plurality of servers has access to the MTS' data; however, other alternative configurations may be used instead.

In one embodiment, system 616, shown in FIG. 2, implements a web-based customer relationship management (CRM) system. For example, in one embodiment, system 616 includes application servers configured to implement and execute CRM software applications as well as provide related data, code, forms, webpages and other information to and from user systems 612 and to store to, and retrieve from, a database system related data, objects, and Webpage content. With a multi-tenant system, data for multiple tenants may be stored in the same physical database object, however, tenant data typically is arranged so that data of one tenant is kept logically separate from that of other tenants so that one tenant does not have access to another tenant's data, unless such data is expressly shared. In certain embodiments, system 616 implements applications other than, or in addition to, a CRM application. For example, system 616 may provide tenant access to multiple hosted (standard and custom) applications, including a CRM application. User (or third party developer) applications, which may or may not include CRM, may be supported by the application platform 618, which manages creation, storage of the applications into one or more database objects and executing of the applications in a virtual machine in the process space of the system 616.

One arrangement for elements of system 616 is shown in FIG. 2, including a network interface 620, application platform 618, tenant data storage 622 for tenant data 623, system data storage 624 for system data 625 accessible to system 616 and possibly multiple tenants, program code 626 for implementing various functions of system 616, and a process space 628 for executing MTS system processes and tenant-specific processes, such as running applications as part of an application hosting service. Additional processes that may execute on system 616 include database indexing processes.

Several elements in the system shown in FIG. 2 include conventional, well-known elements that are explained only briefly here. For example, each user system 612 could include a desktop personal computer, workstation, laptop, PDA, cell phone, or any wireless access protocol (WAP) enabled device or any other computing device capable of interfacing directly or indirectly to the Internet or other network connection. User system 612 typically runs an HTTP client, e.g., a browsing program, such as Edge from Microsoft, Safari from Apple, Chrome from Google, or a WAP-enabled browser in the case of a cell phone, PDA or other wireless device, or the like, allowing a user (e.g., subscriber of the multi-tenant database system) of user system 612 to access, process and view information, pages and applications available to it from system 616 over network 614. Each user system 612 also typically includes one or more user interface devices, such as a keyboard, a mouse, touch pad, touch screen, pen or the like, for interacting with a graphical user interface (GUI) provided by the browser on a display (e.g., a monitor screen, LCD display, etc.) in conjunction with pages, forms, applications and other information provided by system 616 or other systems or servers. For example, the user interface device can be used to access data and applications hosted by system 616, and to perform searches on stored data, and otherwise allow a user to interact with various GUI pages that may be presented to a user. As discussed above, embodiments are suitable for use with the Internet, which refers to a specific global internetwork of networks. However, it should be understood that other networks can be used instead of the Internet, such as an intranet, an extranet, a virtual private network (VPN), a non-TCP/IP based network, any LAN or WAN or the like.

According to one embodiment, each user system 612 and all of its components are operator configurable using applications, such as a browser, including computer code run using a central processing unit such as an Intel Core series processor or the like. Similarly, system 616 (and additional instances of an MTS, where more than one is present) and all of their components might be operator configurable using application(s) including computer code to run using a central processing unit such as processor system 617, which may include an Intel Core series processor or the like, and/or multiple processor units. A computer program product embodiment includes a machine-readable storage medium (media) having instructions stored thereon/in which can be used to program a computer to perform any of the processes of the embodiments described herein. Computer code for operating and configuring system 616 to intercommunicate and to process webpages, applications and other data and media content as described herein are preferably downloaded and stored on a hard disk, but the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any type of media or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for implementing embodiments can be implemented in any programming language that can be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

According to one embodiment, each system 616 is configured to provide webpages, forms, applications, data and media content to user (client) systems 612 to support the access by user systems 612 as tenants of system 616. As such, system 616 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to include a computer system, including processing hardware and process space(s), and an associated storage system and database application (e.g., OODBMS or RDBMS) as is well known in the art. It should also be understood that "server system" and "server" are often used interchangeably herein. Similarly, the database object described herein can be implemented as single databases, a distributed database, a collection of distributed databases, a database with redundant online or offline backups or other redundancies, etc., and might include a distributed database or storage network and associated processing intelligence.

FIG. 3 also illustrates environment 610. However, in FIG. 3 elements of system 616 and various interconnections in an embodiment are further illustrated. FIG. 3 shows that user system 612 may include processor system 612A, memory system 612B, input system 612C, and output system 612D. FIG. 3 shows network 614 and system 616. FIG. 3 also shows that system 616 may include tenant data storage 622, tenant data 623, system data storage 624, system data 625, User Interface (UI) 730, Application Program Interface (API) 732, PL/SOQL 734, save routines 736, application setup mechanism 738, applications servers 7001-700N, system process space 702, tenant process spaces 704, tenant management process space 710, tenant storage area 712, user storage 714, and application metadata 716. In other embodiments, environment 610 may not have the same elements as those listed above and/or may have other elements instead of, or in addition to, those listed above.

User system 612, network 614, system 616, tenant data storage 622, and system data storage 624 were discussed above in FIG. 2. Regarding user system 612, processor system 612A may be any combination of one or more processors. Memory system 612B may be any combination of one or more memory devices, short term, and/or long-term memory. Input system 612C may be any combination of input devices, such as one or more keyboards, mice, trackballs, scanners, cameras, and/or interfaces to networks. Output system 612D may be any combination of output devices, such as one or more monitors, printers, and/or interfaces to networks. As shown by FIG. 3, system 616 may include a network interface 620 (of FIG. 2) implemented as a set of HTTP application servers 700, an application platform 618, tenant data storage 622, and system data storage 624. Also shown is system process space 702, including individual tenant process spaces 704 and a tenant management process space 710. Each application server 700 may be configured to tenant data storage 622 and the tenant data 623 therein, and system data storage 624 and the system data 625 therein to serve requests of user systems 612. The tenant data 623 might be divided into individual tenant storage areas 712, which can be either a physical arrangement and/or a logical arrangement of data. Within each tenant storage area 712, user storage 714 and application metadata 716 might be similarly allocated for each user. For example, a copy of a user's most recently used (MRU) items might be stored to user storage 714. Similarly, a copy of MRU items for an entire organization that is a tenant might be stored to tenant storage area 712. A UI 730 provides a user interface, and an API 732 provides an application programmer interface to system 616 resident processes to users and/or developers at user systems 612. The tenant data and the system data may be stored in various databases, such as one or more Oracle™ databases.

Application platform 618 includes an application setup mechanism 738 that supports application developers' creation and management of applications, which may be saved as metadata into tenant data storage 622 by save routines 736 for execution by subscribers as one or more tenant process spaces 704 managed by tenant management process 710 for example. Invocations to such applications may be coded using PL/SOQL 734 that provides a programming language style interface extension to API 732. Invocations to applications may be detected by one or more system processes, which manage retrieving application metadata 716 for the subscriber making the invocation and executing the metadata as an application in a virtual machine.

Each application server 700 may be communicably coupled to database systems, e.g., having access to system data 625 and tenant data 623, via a different network connection. For example, one application server 7001 might be coupled via the network 614 (e.g., the Internet), another application server 700N-1 might be coupled via a direct network link, and another application server 700N might be coupled by yet a different network connection. Transfer Control Protocol and Internet Protocol (TCP/IP) are typical protocols for communicating between application servers 700 and the database system. However, it will be apparent to one skilled in the art that other transport protocols may be used to optimize the system depending on the network interconnect used.

In certain embodiments, each application server 700 is configured to handle requests for any user associated with any organization that is a tenant. Because it is desirable to be able to add and remove application servers from the server pool at any time for any reason, there is preferably no server affinity for a user and/or organization to a specific application server 700. In one embodiment, therefore, an interface system implementing a load balancing function (e.g., an F5 BIG-IP load balancer) is communicably coupled between the application servers 700 and the user systems 612 to distribute requests to the application servers 700. In one embodiment, the load balancer uses a least connections algorithm to route user requests to the application servers 700. Other examples of load balancing algorithms, such as round robin and observed response time, also can be used. For example, in certain embodiments, three consecutive requests from the same user could hit three different application servers 700, and three requests from different users could hit the same application server 700. In this manner, system 616 is multi-tenant, wherein system 616 handles storage of, and access to, different objects, data and applications across disparate users and organizations.

As an example of storage, one tenant might be a company that employs a sales force where each field technician uses system 616 to manage their sales process. Thus, a user might maintain contact data, leads data, customer follow-up data, performance data, goals and progress data, etc., all applicable to that user's personal sales process (e.g., in tenant data storage 622). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 616 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant specific data, system 616 might also maintain system level data usable by multiple tenants or other data. Such system level data might include industry reports, news, postings, and the like that are sharable among tenants.

In certain embodiments, user systems 612 (which may be client systems) communicate with application servers 700 to request and update system-level and tenant-level data from system 616 that may require sending one or more queries to tenant data storage 622 and/or system data storage 624. System 616 (e.g., an application server 700 in system 616) automatically generates one or more SQL statements (e.g., one or more SQL queries) that are designed to access the desired information. System data storage 624 may generate query plans to access the requested data from the database.

Each database can generally be viewed as a collection of objects, such as a set of logical tables, containing data fitted into predefined categories. A "table" is one representation of a data object and may be used herein to simplify the conceptual description of objects and custom objects. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for Account, Contact, Lead, and Opportunity data, each containing pre-defined fields. It should be understood that the word "entity" may also be used interchangeably herein with "object" and "table."

In some multi-tenant database systems, tenants may be allowed to create and store custom objects, or they may be allowed to customize standard entities or objects, for example by creating custom fields for standard objects, including custom index fields. In certain embodiments, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

Techniques and technologies may be described herein in terms of functional and/or logical block components, and with reference to symbolic representations of operations, processing tasks, and functions that may be performed by various computing components or devices. Such operations, tasks, and functions are sometimes referred to as being computer-executed, computerized, software-implemented, or computer-implemented. It should be appreciated that the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices.

When implemented in software or firmware, various elements of the systems described herein are essentially the code segments or instructions that perform the various tasks. In certain embodiments, the program or code segments are stored in a tangible processor-readable medium, which may include any medium that can store or transfer information. Examples of a non-transitory and processor-readable medium include an electronic circuit, a semiconductor memory device, a ROM, a flash memory, an erasable ROM (EROM), a floppy diskette, a CD-ROM, an optical disk, a hard disk, or the like.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. A method for change management upon login, comprising:
   constructing, by a change management processor, an administratively prescribed target data store as a function of received administrative input;
   storing, by the change management processor, the administratively prescribed target data store in a target data database;
   receiving from an input system, by the change management processor, a login, the login comprising login information for a user, the login information having a username identifier and a service provider identifier;
   responsive to receiving the login: (a) querying, by the change management processor, a historical data store having stored therein, a user status that associates the username identifier and the service provider identifier with a previously used feature and feature-state; (b) querying, by the change management processor, the administratively prescribed target data store using the service provider identifier, to obtain a target feature and target feature-state, a mismatch message, and a match message; and (c) determining, by the change management processor, whether the previously used feature and feature-state match the target feature and target feature-state, respectively;
   displaying the mismatch message when the previously used feature and feature-state do not match the target feature and target feature-state, respectively; and
   displaying the match message when the previously used feature and feature-state match the target feature and target feature-state, respectively.

2. The method of claim 1, further comprising, when the previously used feature and feature-state do not match the target feature and target feature-state, respectively:
   determining, by the change management processor, that the user is attempting to use an outdated version of the target feature; and
   displaying an updated version available message responsive thereto.

3. The method of claim 2, further comprising:
   upon displaying the updated version available message, determining that the user previously used the target feature with the target feature-state and subsequently reverted to using the target feature with the previously used feature-state; and
   displaying a user prompt asking why the user reverted to the previously used feature-state.

4. The method of claim 1, further comprising:
  determining, by the change management processor, when a new feature is available; and
  displaying a new feature available message responsive thereto.

5. The method of claim 1, further comprising, when the previously used feature and feature-state do not match the target feature and target feature-state, respectively:
  determining, by the change management processor, that the username identifier is not authorized to use any combination of the service provider identifier, the previously used feature, or the target feature; and
  displaying a failed authorization message responsive thereto.

6. The method of claim 1, wherein:
  the service provider identifier is one of a plurality of service provider identifiers;
  the username identifier is one of a plurality of username identifiers;
  each username identifier has an association with at least one service provider identifier of the plurality of service provider identifiers; and
  the historical data store further has stored therein, for each association of each username identifier of the plurality of username identifiers, a respective user status that associates the username identifier and the service provider identifier of the plurality of service provider identifiers, the user status further associating with the service provider identifier, a respective previously used feature and feature-state.

7. The method of claim 6, wherein:
  each service provider identifier of the plurality of service provider identifiers has at least one target feature and each target feature of the at least one target feature has a respective target feature-state; and
  the target data database further has stored therein, for each of the at least one target feature of each service provider identifier of the plurality of service provider identifiers: the target feature-state, the mismatch message, and the match message.

8. A non-transitory computer-readable medium having stored thereon instructions that, when executed by one or more processors, are configurable to cause the one or more processors to:
  construct an administratively prescribed target data store as a function of received administrative input;
  store the administratively prescribed target data store in a target data database;
  detect a login, defined as receiving login information for a user from an input system, the login information having a username identifier and service provider identifier;
  responsive to the login: (a) query a historical data store having stored therein, a user status that associates the username identifier and the service provider identifier with a previously used feature and feature-state; (b) query the administratively prescribed target data store using at least the service provider identifier to obtain a target feature and target feature-state, a mismatch message, and a match message; and (c) determine when there is a mismatch, defined as the previously used feature and feature-state do not match the target feature and target feature-state, respectively;
  display the mismatch message when there is a mismatch; and
  display the match message when there is not a mismatch.

9. The non-transitory computer-readable medium of claim 8, wherein the instructions are further configurable to cause the one or more processors to, when there is a mismatch:
  determine that the user is attempting to use an outdated version of the target feature; and
  display an updated version available message responsive thereto.

10. The non-transitory computer-readable medium of claim 9, wherein the instructions are further configurable to cause the one or more processors to:
  upon displaying the updated version available message, determine that the user previously used the target feature with the target feature-state; and
  display a user prompt asking why the user stopped using the target feature with the target feature-state.

11. The non-transitory computer-readable medium of claim 8, wherein the instructions are further configurable to cause the one or more processors to:
  determine when a new feature is available; and
  display a new feature available message responsive thereto.

12. The non-transitory computer-readable medium of claim 8, wherein the instructions are further configurable to cause the one or more processors to, when there is a mismatch:
  determine that the username identifier has lost authorization to use any of the service provider identifier, the previously used feature, or the target feature; and
  display a failed authorization message responsive thereto.

13. The non-transitory computer-readable medium of claim 8, wherein:
  the service provider identifier is one of a plurality of service provider identifiers;
  the username identifier is one of a plurality of username identifiers;
  each username identifier has an association with at least one service provider identifier of the plurality of service provider identifiers; and
  the historical data store further has stored therein, for each association of each username identifier of the plurality of username identifiers, a respective user status that associates the username identifier and the service provider identifier of the plurality of service provider identifiers, the user status further associating with the service provider identifier, a respective previously used feature and feature-state.

14. The non-transitory computer-readable medium of claim 8, wherein:
  each service provider identifier of a plurality of service provider identifiers has at least one target feature and each target feature of the at least one target feature has a respective target feature-state; and
  the target data database further has stored therein, for each of the at least one target feature of each service provider identifier of the plurality of service provider identifiers: the target feature-state, the mismatch message, and the match message.

15. A change management system, comprising:
  a historical data store having stored therein, a user status that associates a username identifier and a service provider identifier with a previously used feature and feature-state; and
  a change management processor programmed to:
  construct an administratively prescribed target data store as a function of received administrative input, the received administrative input specifying, for the service provider identifier: a target feature and target feature-state, a mismatch message, and a match message;

receive a login, the login providing login information for a user, the login information including the username identifier and the service provider identifier;

query the historical data store with the username identifier and service provider identifier to obtain the previously used feature and feature-state;

query the administratively prescribed target data store to obtain, for the service provider identifier, the target feature and target feature-state, the mismatch message, and the match message;

determine whether there is a mismatch between the previously used feature and feature-state and the target feature and target feature-state, respectively;

display the mismatch message when there is a mismatch; and display the match message when there is not a mismatch.

16. The change management system of claim 15, wherein the change management processor is further configured to:
determine that the mismatch represents that the user is attempting to use an outdated version of the target feature; and
display an updated version available message responsive thereto.

17. The change management system of claim 16, wherein the change management processor is further configured to:
upon displaying the updated version available message,
determine that the user previously used the target feature with the target feature-state and subsequently reverted to using the target feature with the previously used feature-state; and
display a user prompt asking why the user reverted to the previously used feature-state.

18. The change management system of claim 17, wherein the change management processor is further configured to:
determine when a new feature is available; and
display a new feature available message responsive thereto.

19. The change management system of claim 15, wherein the change management processor is further configured to:
determine that the mismatch represents that the username identifier does not have authorization to use any of the service provider identifier, the previously used feature, or the target feature; and
display a failed authorization message responsive thereto.

20. The change management system of claim 19, wherein the service provider identifier is one of a plurality of service provider identifiers;
the username identifier is one of a plurality of username identifiers;
each username identifier has an association with at least one service provider identifier of the plurality of service provider identifiers; and
the historical data store further has stored therein, for each association of each username identifier of the plurality of username identifiers, a respective user status that associates the username identifier and the service provider identifier of the plurality of service provider identifiers, the user status further associating with the service provider identifier, a respective previously used feature, feature-state, and use-timestamp.

* * * * *